United States Patent
Himmel

(10) Patent No.: US 8,501,012 B2
(45) Date of Patent: Aug. 6, 2013

(54) BYPASS FILTER APPARATUS AND METHOD

(75) Inventor: David Himmel, Pearland, TX (US)

(73) Assignee: Schlumberger Technology Corporation, Sugar Land, TX (US)

(*) Notice: Subject to any disclaimer, the term of this patent is extended or adjusted under 35 U.S.C. 154(b) by 848 days.

(21) Appl. No.: 12/423,157

(22) Filed: Apr. 14, 2009

(65) Prior Publication Data
US 2009/0255878 A1 Oct. 15, 2009

Related U.S. Application Data

(60) Provisional application No. 61/045,139, filed on Apr. 15, 2008.

(51) Int. Cl.
*C02F 1/00* (2006.01)

(52) U.S. Cl.
USPC ..... 210/741; 166/75.11; 166/105; 166/177.5; 166/183; 166/184; 166/187; 166/319; 166/369; 166/387; 210/117; 210/130; 210/790

(58) Field of Classification Search
None
See application file for complete search history.

(56) References Cited

U.S. PATENT DOCUMENTS

| | | | | |
|---|---|---|---|---|
| 3,437,135 A * | 4/1969 | Cox et al. | | 166/115 |
| 4,399,871 A * | 8/1983 | Adkins et al. | | 166/325 |
| 6,423,215 B1 * | 7/2002 | Stein | | 210/131 |
| 7,469,748 B2 | 12/2008 | Ocalan | | |
| 7,921,915 B2 * | 4/2011 | Richard et al. | | 166/334.4 |
| 2006/0266526 A1 | 11/2006 | Ocalan | | |
| 2006/0283791 A1 * | 12/2006 | Ross | | 210/429 |
| 2007/0183900 A1 | 8/2007 | Ocalan | | |
| 2008/0110614 A1 | 5/2008 | Orban | | |

* cited by examiner

Primary Examiner — Dirk Bass

(57) ABSTRACT

A filter sub apparatus comprising a housing configured to contain a filter and a bypass mechanism is provided. The bypass mechanism may be actuated upon debris buildup on the filter resulting in a load applied to the bypass mechanism rising above a predetermined lower level. A method to prevent chemical injection process failures may also be provided. The method may comprise the steps of providing a filter sub prior to a check valve. The filter sub may include a filter and a bypass mechanism. Another step may be passing fluid through the filter. In addition, the steps may also include containing at least some debris on a side of the filter such that the debris is prevented from reaching the check valve. A further step may be actuating the bypass mechanism after the debris builds up to a level in which a resulting load applied to the bypass mechanism exceeds a lower limit.

6 Claims, 3 Drawing Sheets

FIG. 3A
FIG. 3B
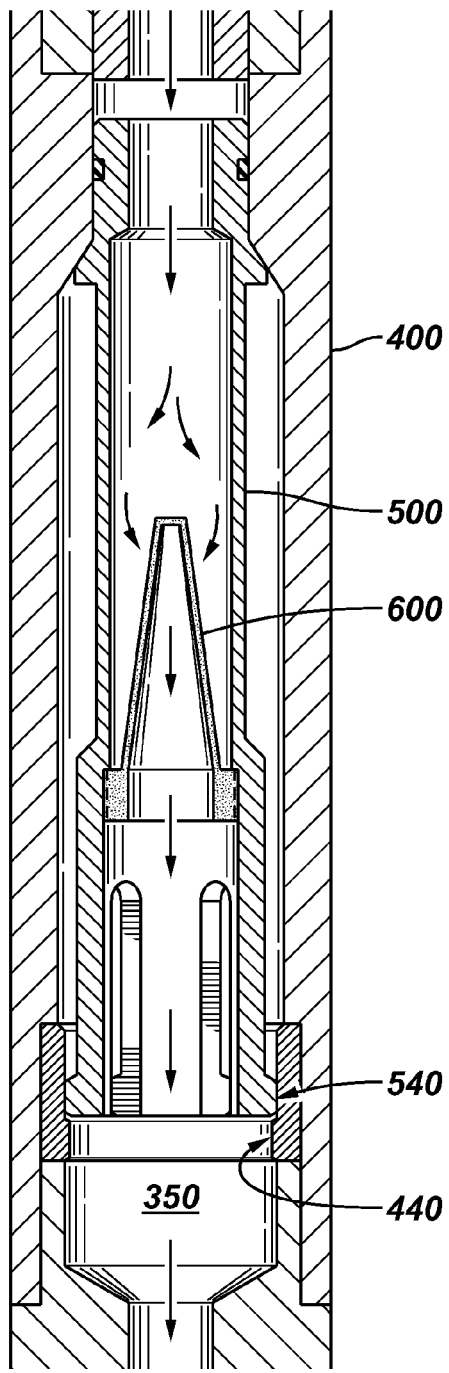
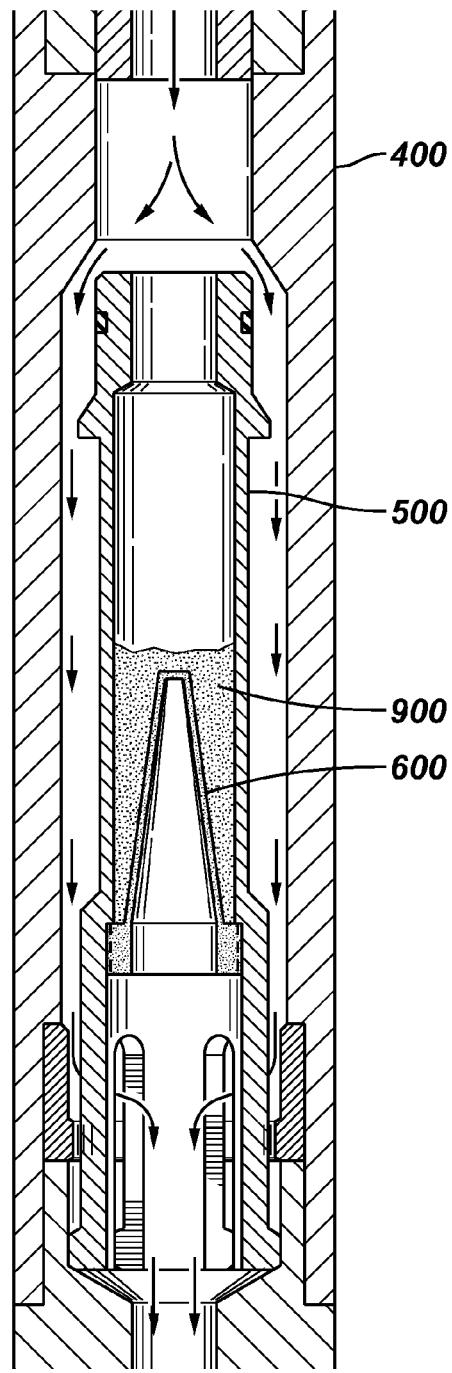

BYPASS FILTER APPARATUS AND METHOD

RELATED APPLICATIONS

This application claims the benefit of U.S. Provisional Application No. 61/045,139, filed Apr. 15, 2008, the contents of which are herein incorporated by reference.

BACKGROUND

1. Field of the Invention

Embodiments of the present invention generally relate to inline filter devices used for filtering flowing fluid and more particularly to clog tolerant inline filter devices with a bypass feature such as may be used in a chemical injection system.

2. Description of the Related Art

The following descriptions and examples are not admitted to be prior art by virtue of their inclusion in this section.

In typical wellbore operations, conventional chemical injection systems deploy selected chemicals in oil and gas wells for the purposes of controlling tubing corrosion, paraffin buildup, hydrate plugging, etc. Down-hole injection systems are typically comprised of a fluid reservoir, a surface pumping system, plumbing to the wellhead or sub-sea umbilical, a capillary tube attached to the exterior of the production tubing string, a ported mandrel installed in the tubing string, and a complement of back-check valves that prevent downhole fluid ingression into or through the injection system.

Chemical injection systems generally consist of an injection line run from the surface to a side pocket mandrel in the production tubing string. The mandrel is either equipped with internal check valves or attached to a cartridge which contains check valves that allow injection of treating chemicals from the surface while retaining tubing (reservoir) pressure.

By design, all check valves are inherently sensitive to debris. As treating chemicals are pumped from the surface any debris suspended in the treating chemicals will be forced to travel through the check valves. Often debris will be too large to travel through the check valves and may become lodged in the valve. This debris can keep the check valve from properly closing. If the check valves are unable to close, the pressure and fluid in the production tubing will be able to communicate with the injection line, thereby contaminating the injection fluid and otherwise preventing effective chemical injection of a well. In many applications, the use of chemical injection is critical to production. However, an improperly functioning chemical injection system may result in the removal of the completion.

In most cases debris related failures in chemical injection systems occur almost immediately after installation. Generally debris is either introduced during the termination of injection lines or it may be present in pumps, tanks, or lines prior to injection. As injection begins the debris is quickly circulated downhole to the check valves, resulting in immediate initial failures. The contamination level present in the treating chemicals of a chemical injection process is generally very low. This low level can be further regulated through the use of surface filtration. As such, if the valves are not damaged due to start up debris, the probability of future debris related failures is relatively low. What is needed is a cost effective way to filter fluid while providing a contingency in cases in which the filter becomes clogged with debris.

SUMMARY

In accordance with one embodiment of the invention, a filter sub apparatus comprising a housing configured to contain a filter and a bypass mechanism may be provided. The bypass mechanism may be actuated upon debris buildup on the filter resulting in a load applied to the bypass mechanism rising above a predetermined lower level.

In accordance with another embodiment of the invention, a method to prevent chemical injection process failures may also be provided. The method may comprise the steps of providing a filter sub prior to a check valve. The filter sub may include a filter and a bypass mechanism. Another step may be passing fluid through the filter. In addition, the steps may also include containing at least some debris on a side of the filter such that the debris is prevented from reaching the check valve. A further step may be actuating the bypass mechanism after the debris builds up to a level in which a resulting load applied to the bypass mechanism exceeds a lower limit.

Other or alternative features will become apparent from the following description, from the drawings, and from the claims.

BRIEF DESCRIPTION OF THE DRAWINGS

Certain embodiments of the invention will hereafter be described with reference to the accompanying drawings, wherein like reference numerals denote like elements. It should be understood, however, that the accompanying drawings illustrate only the various implementations described herein and are not meant to limit the scope of various technologies described herein. The drawings are as follows:

FIG. 3A is a partial cross-sectional side view of a filter sub in a non-bypass configuration in accordance with an embodiment of the claimed invention;

FIG. 3B is a partial cross-sectional side view of the filter sub of FIG. 3A in a bypass configuration in accordance with an embodiment of the claimed invention.

DETAILED DESCRIPTION

In the following description, numerous details are set forth to provide an understanding of the present invention. However, it will be understood by those of ordinary skill in the art that the present invention may be practiced without these details and that numerous variations or modifications from the described embodiments may be possible. In the specification and appended claims: the terms "connect", "connection", "connected", "in connection with", "connecting", "couple", "coupled", "coupled with", and "coupling" are used to mean "in direct connection with" or "in connection with via another element"; and the term "set" is used to mean "one element" or "more than one element". As used herein, the terms "up" and ""down", "upper" and "lower", "upwardly" and downwardly", "upstream" and "downstream"; "above" and "below"; and other like terms indicating relative positions above or below a given point or element are used in this description to more clearly describe some embodiments of the invention.

Embodiments of the claimed invention may have multiple applications and uses. However, in the interest of simplifying the description, most embodiments will be described as being used in conjunction with downhole chemical injection systems as a non-limiting example. Embodiments of a filter sub may be adapted for use in other hydraulic or fluid systems that are sensitive to debris.

Embodiments of a filter sub may be made up in an injection line in the annular space between a casing and production tubing, for example, such as provided directly above a chemical injection valve. The filter sub may comprise externally testable hydraulic connectors. All treating chemicals may initially pass through the filter sub before reaching check valves in the chemical injection mandrel. The filter sub may include a filter or screen that is configured to capture debris capable of impeding check valve functionality. In cases in which the filter becomes plugged, the pressure required to pump fluid across the filter increases. To ensure that the chemical injection is not interrupted or otherwise impeded, an automatic filter bypass may be triggered if the increase in the pressure exceeds a predetermined level. After the filter has been bypassed, the debris that created the plug will generally be retained in a sump located above the filter. The bypass may allow the fluid to continue to flow through the filter sub, thereby facilitating the continuation of the injection process.

Figure 1:
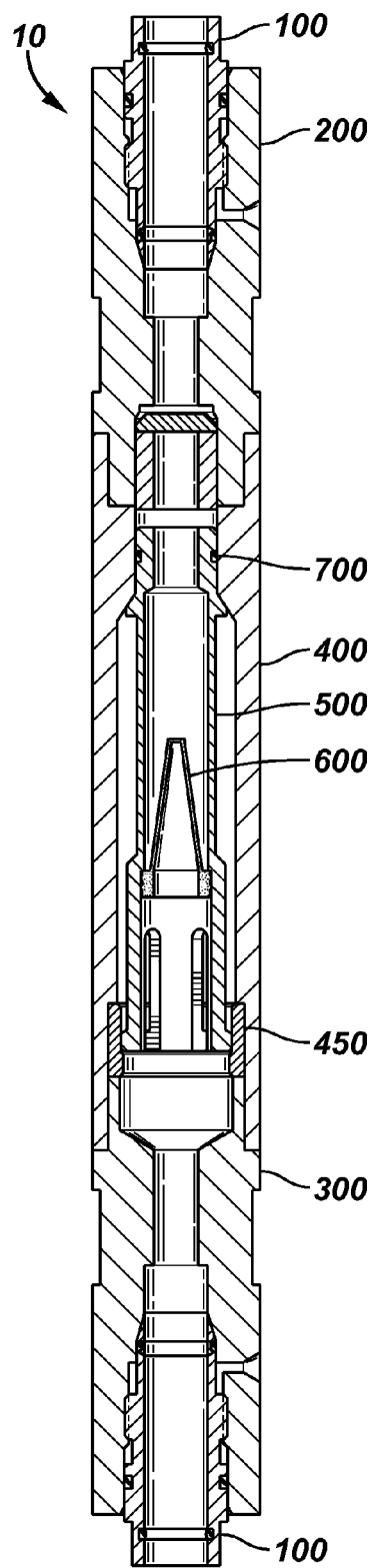
FIG. 1 is a cross-sectional side view of a filter sub in accordance with an embodiment of the claimed invention.

Referring generally to FIG. 1, an illustrative embodiment of a filter sub 10 is shown in a cross-sectional side view. The filter sub 10 may comprise an upper and lower hydraulic dry mate connector 100 (HDMC) respectively coupled to an upper housing 200 and a lower housing 300. The upper housing 200 may be coupled to the lower housing 300 via a filter housing 400. Although three separate housings are shown in this exemplary embodiment (200, 300, and 400), other embodiments of the invention may not be limited to this configuration. Less than three or more than three housings may be used depending upon manufacturing and machining techniques. In addition, the three housings (200, 300, and 400) and the upper and lower HDMCs 100 may be coupled together via a variety of techniques not limited to the threaded or welded connections shown. Other techniques may include press, snap fit, or interlocking components, or chemical adhesive, among others. In some cases, the three housings (200, 300, and 400) may be substantially cylindrical in shape and enclose a central bore for fluid flow.

The filter housing 400 may comprise an inner sleeve 500 and a filter 600. One end of the inner sleeve 500 may be substantially sealed to the interior of the intermediate filter housing 400 via one or more seals 700 (only one seal is shown in this non-limiting example). Another end of the inner sleeve 500 may be releasably coupled with a restraint feature 450. The restraint feature 450 may be coupled with engaging features of the inner sleeve 500, such as collet fingers (detailed later) for example. The filter 600 may be coupled with the interior bore of the inner sleeve 500 through a variety of non-limiting techniques.

Figure 2:
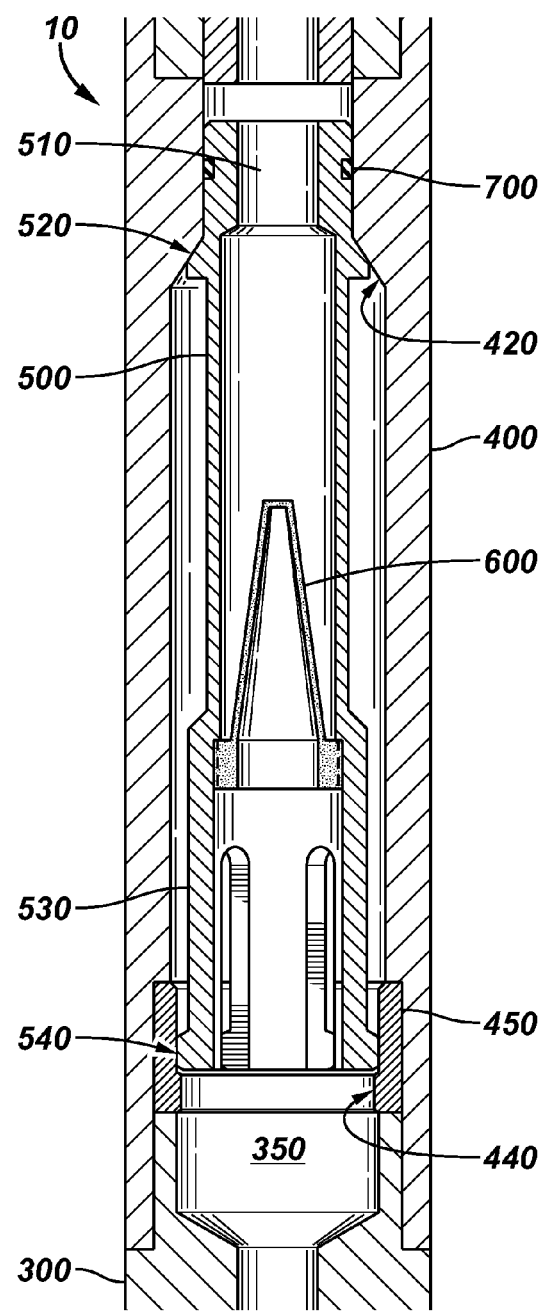
FIG. 2 is an enlarged portion of the cross-sectional side view of FIG. 1.

Turning now to FIG. 2, this figure illustrates an enlarged portion of the filter housing 400 in a cross-sectional side view in order to more easily identify exemplary aspects of an embodiment of the claimed invention. As shown in the figure, inner sleeve 500 is contained within the filter housing 400. Included within the inner sleeve 500 is the filter 600. In some embodiments, the filter 600 may be a metallic screen sized to capture any debris that can not pass freely through standard chemical injection check valves. The filter 600 may be equipped with external threads configured to engage internal threads in the inner sleeve central bore 510. In some embodiments, prior to installation of the filter 600, the threads on both the filter 600 and the inner sleeve 500 may be coated with a high temperature and high strength chemical formula, such as Loctite® 272 for example. In other embodiments, the filter 600 may comprise non-metallic, permeable, or coated materials configured to accommodate the expected flow rate of the fluid through the filter sub 10. Alternatively, one or more additional components may be used to fix the filter 600 in relation to the inner sleeve 500 (e.g., such as a retention ring or set screws, among others), while in other embodiments, the filter 600 may be fixedly attached directly to the inner sleeve 500. The filter 600 may be used for the life of the inner sleeve 500 or may be configured to be replaceable.

One or more seals 700 may be used to establish a pressure tight seal between the inner sleeve 500 and the filter housing 400, thereby forcing fluid such as injected chemicals to pass through the central bore 510 of the inner sleeve 500 and the filter 600. Debris that can not pass through the filter 600 may be retained in the central bore 510 of the inner sleeve 500 on the upstream side of the filter 600 (the top as shown in FIG. 2 for an injection system). The central bore 510 above the filter 600 may serve as a debris sump. The one or more seals 700 may be in the form of an o-ring. The seal 700 may provide a substantially fluid tight seal between the outer circumference of one end of the inner sleeve 500 and the inner circumference of the filter housing 400.

In addition to the one or more seals 700, one end of the inner sleeve 500 may comprise an inner sleeve protruding interface 520. The inner sleeve protruding interface 520 may be configured to abut against a corresponding feature in the filter housing 400, such as a filter housing protruding interface 420, although embodiments of the invention may not be limited to this example. In this case, both the inner sleeve and filter housing protruding interfaces 520 and 420 may be configured to be substantially conical in shape. In other cases, the protruding interfaces 520, 420 may be configured to provide a secondary or primary seal between the inner sleeve 500 and the filter housing 400. During assembly, the inner sleeve protruding interface 520 may provide an axial limit to the insertion of the inner sleeve 500 into the filter housing 400. This limit should be designed such that the engaging features of the inner sleeve 500 are able to be coupled to the engaging features of the filter housing 400.

In this illustrative embodiment, the inner sleeve 500 comprises one or more collet fingers 530 including raised finger profiles 540. The raised finger profiles 540 may be configured to engage with raised restraint profiles 440 provided in the restraint feature 450 (e.g., such as a retaining ring, among other examples of restraint features). The engagement between the finger profiles 540 and the restraint profiles 440 may be configured to release at a desired axial load range. Of course, other embodiments may not be limited to this configuration for providing a releasable coupling between the inner sleeve 500 and the filter housing 400. For example, snap rings, shear screws, and/or increased frictional surfaces, among others, may be used to releasably retain the inner sleeve 500 in axial position with the filter housing 400 until subjected to an axial load exceeding a predetermined amount. Alternatively, the housing 400 may comprise the collet fingers and the inner sleeve 500 may comprise a restraint profile. Although the profiles of the collet fingers 530 and the restraint feature 450 are both shown in this illustrative embodiment as raised protrusions, this should be considered as a non-limiting example. One or both of the components may contain a recessed profile, a combination of profiles, or other methods designed to releasably retain the inner sleeve 500 in axial position relative to the filter housing 400 until an axial load limit applied to the inner sleeve 500 is exceeded.

The inner sleeve 500 may surround an inner sleeve central bore 510 to filter fluid flowing there through. (See FIG. 3A) In the event that a large amount of debris 900 (see FIG. 3B) is captured by the filter 600, pressure may build up on the inner sleeve 500, thereby applying an axial load to the component. When the load exceeds a predetermined lower limit, the finger profiles 540 of the inner sleeve 500 may be disengaged from the restraint profiles 440 of the filter housing 400. As the inner sleeve 500 is released, the one or more seals 700 on the inner sleeve 500 may be pulled out of the seal bore on the housing 400. The inner sleeve 500 may then be free to move axially downstream until it occupies a lower space 350. Upon reaching the lower space 350, the interaction between the ends of the collet fingers 530 and the configuration of the lower space 350 may prevent or inhibit further axial movement of the inner sleeve 500. The debris 900 that created the original plug may be retained in the sump or inner sleeve central bore 510 above the filter 600. With the one or more seals 700 disengaged from the seal bore of the interior circumference of the housing 400, the treating chemicals would then be free to flow around, or bypass, the inner sleeve 500.

FIG. 3A shows an embodiment of the invention in an initial position. The arrow demonstrates the initial pre-bypass flow of the fluid through the central bore 510 of the inner sleeve 500 and filter 600 to exit out of the bottom of the device. FIG. 3B shows the embodiment of FIG. 3A when the inner sleeve 500 is in a bypass position due to a collection of debris 900 on the upstream side of the filter 600. As shown by the arrows in FIG. 3B, the inner sleeve 500 moves to a location within the filter housing 400 such that fluid is able to flow around the inner sleeve 500, as opposed to through it. Of course, the fluid is no longer completely subjected to the screening effect of the filter 600 while in the bypass configuration. However, the debris 900 collected in a sump formed by the inner sleeve central bore 510 above the filter 600 is not released into the fluid stream during the activation of the bypass mechanism. In most cases, such as in a chemical injection process in which the majority of debris 900 is present and collected during the initial stages of the injection process, the bypass configuration should not result in a large amount of additional debris passing to the check valves of the system.

Figure 4:
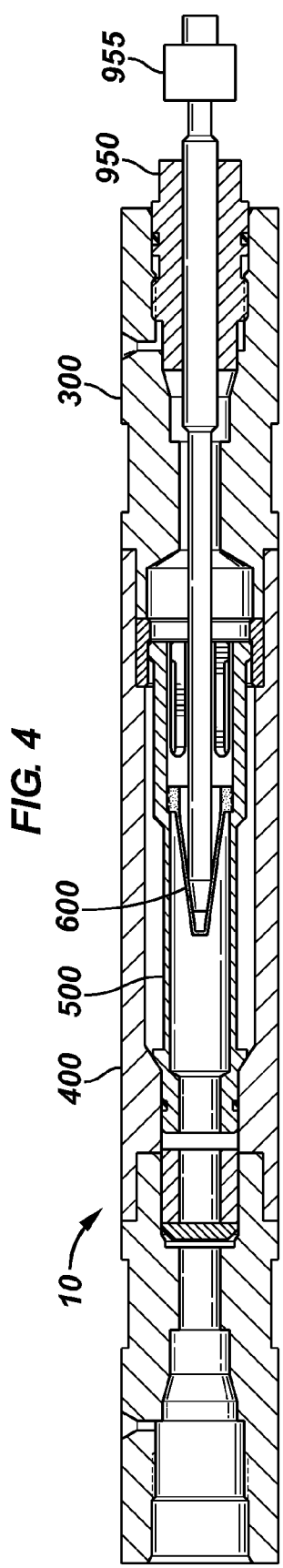
FIG. 4 is a cross-sectional side view showing the application of a resetting tool in a filter sub in accordance with an embodiment of the claimed invention.

Referring generally to FIG. 4, after assembly a completed filter sub 10 there may be instances in which the assembly is dropped or otherwise subjected to a force that releases the engagement between the inner sleeve 500 and the filter housing 400, placing the filter sub 10 in a bypass configuration. The inner sleeve 500 may be reset to an initial, non-bypassed position in an assembled device through the use of a resetting tool. The resetting tool may comprise a coupling device 950 and a resetting device 955. The coupling device 950 may be threadably attached to the lower housing 300 and provide a threaded orifice to attach and support the resetting device 955. The resetting device 955 may then be threaded into the filter sub 10 until one end of the resetting device 955 engages the filter 600. By rotating the resetting device 955 relative to the coupling device 950, the end of the resetting device 955 may axially translate the inner sleeve 500 relative to the filter housing 400 until there is engagement between the collet fingers 530 and the restraint feature 450 (see FIG. 2). At this point, the one or more seals 700 may sealingly couple the inner sleeve 500 to the seal bore of the filter housing 400 such that fluid will be directed to flow through the central bore 510 and filter 600 of the inner sleeve 500.

In an alternative embodiment, a rupture disc (not shown) may be incorporated in the upper housing 200 (see FIG. 1). The rupture disc may enable the testing of the integrity of the injection line and hydraulic connectors above the disc prior to and during installation.

Both the upper and lower housings 200, 300 (see FIG. 1) may have female profiles configured to couple with appropriate hydraulic connectors, such as the HDMC 100, among others. The HDMC 100 may create a seal between the fluid lines (not shown) and the filter sub 100.

The filter sub 10 (see FIG. 1) may protect the check valves or other downhole tools from debris related failures, such as with the check valves in downhole chemical injection applications. The system may be completely autonomous and may not require an intervention. The filter 600 (see FIG. 1) may be bypassed in the event that it becomes clogged. The bypass mechanism may not reintroduce debris into the system. In the even that the filter 600 is bypassed, the debris that created the plug may be retained in the central bore 510 of the inner sleeve 500 (see FIG. 2). The system may be re-settable at the surface. In some embodiments, the collet fingers 530 (see FIG. 2) on the lower end of the inner sleeve 500 may be replaced with a resilient mechanism such as a spring to allow the inner sleeve 500 to reset downhole.

While the invention has been disclosed with respect to a limited number of embodiments, those skilled in the art, having the benefit of this disclosure, will appreciate numerous modifications and variations therefrom. It is intended that the appended claims cover such modifications and variations as fall within the true spirit and scope of the invention.

What is claimed is:

1. A method to prevent downhole chemical injection process failures, the method comprising:
    providing a filter sub prior to a check valve disposed downhole in a well, wherein the filter sub comprises a filter and a bypass mechanism having an inner sleeve containing the filter;
    sealing the inner sleeve to a surrounding filter housing with at least one seal;
    passing fluid into the inner sleeve and through the filter;
    containing at least some debris within the inner sleeve on a side of the filter such that the at least some debris is prevented from reaching the check valve; and
    actuating the bypass mechanism after the at least some debris builds up to a level in which a resulting load applied to the bypass mechanism exceeds a lower limit and causes the inner sleeve to shift and interrupt the sealing between the inner sleeve and the surrounding filter housing.

2. The method as claimed in claim 1, wherein
    the bypass mechanism is configured to facilitate fluid flow along a first pathway through the filter when sealably coupled to the surrounding filter housing and configured to facilitate fluid flow along a second pathway external to the inner sleeve when the bypass mechanism is not sealably coupled to the surrounding filter housing.

3. The method as claimed in claim 1, wherein
    the bypass mechanism is retained in a first position relative to the surrounding filter housing via engagement of an engagement mechanism, and wherein the bypass mechanism moves to a second position when the engagement mechanism is disengaged; and
    wherein actuating the bypass mechanism includes disengaging the engagement mechanism.

4. The method as claimed in claim 3, wherein the engagement mechanism comprises one or more collet fingers.

5. The method as claimed in claim 3, wherein the first position constrains fluid to flow through the bypass mechanism and the filter, and the second position causes at least some fluid to flow externally of the inner sleeve.

6. The method as claimed in claim 1, wherein the filter is a screen.

* * * * *